Figure 1:
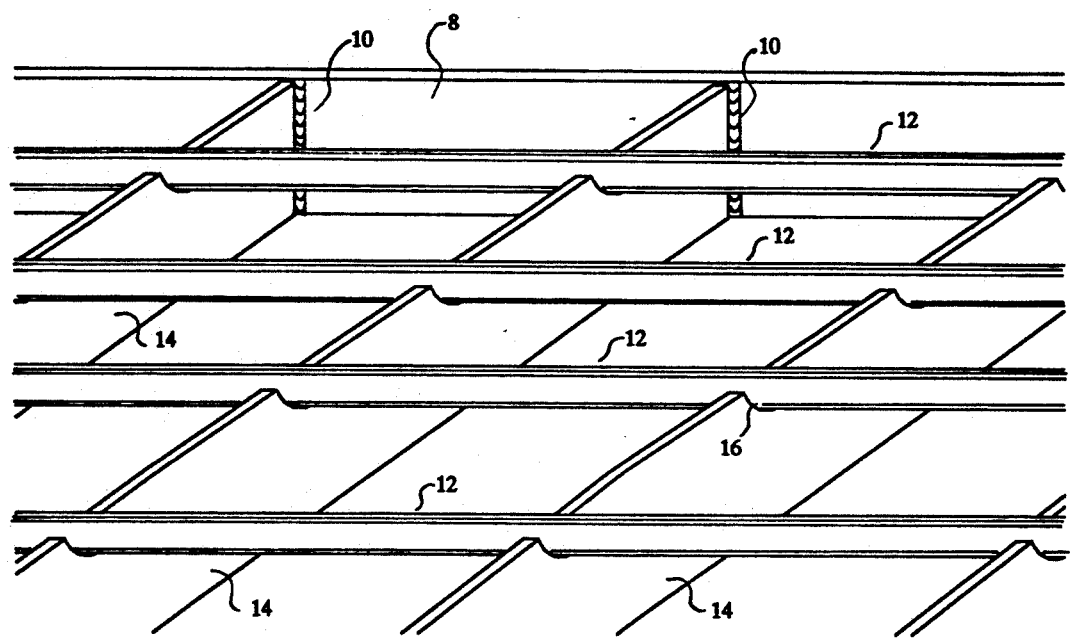

United States Patent [19]

Feuerhelm

[11] Patent Number: 5,257,597
[45] Date of Patent: Nov. 2, 1993

[54] UNI-CONSTRUCTION LIVESTOCK FLOORING

[76] Inventor: Dieter Feuerhelm, 4031 Rundlehorn Dr. N.E., Calgary, Alberta, Canada, T1Y 2K2

[21] Appl. No.: 953,817

[22] Filed: Sep. 30, 1992

[51] Int. Cl.$^5$ ............................................. A01J 1/00
[52] U.S. Cl. ..................................................... 119/28
[58] Field of Search ..................... 119/27, 28, 20, 19, 119/16; 52/664, 666, 667, 668; 15/112, 215, 238

[56] References Cited

U.S. PATENT DOCUMENTS

| | | | |
|---|---|---|---|
| 2,169,649 | 8/1939 | Knapp et al. | 52/667 |
| 2,338,444 | 1/1944 | Lachman | 52/667 |
| 3,181,503 | 5/1965 | Tripp | 119/28 |
| 3,391,513 | 7/1968 | Jones | 52/668 |
| 3,992,163 | 11/1976 | Nagin | 52/668 X |
| 4,362,128 | 12/1982 | Downey | 119/28 |
| 4,976,221 | 12/1990 | Yetter | 119/28 X |

FOREIGN PATENT DOCUMENTS 451167  9/1948  Canada ................................ 52/668

*Primary Examiner*—Gene Mancene
*Assistant Examiner*—Thomas Price

[57] ABSTRACT

A raised, generally rectangular, modular flooring system for livestock comprised of a deck formed from a plurality of substantially equally spaced circular deck bars pairs (18) extending in one direction and permanently crimped or welded to an underlying plurality of circular tie rods (12) substantially equally spaced and extending perpendicular to the deck bar pairs (18). Each of the tie rods (12) is press fused welded to depth approximating the tie rod's (12) diameter into the upper surface of a plurality of equally spaced cross bar supports (14) at right angles to the cross bar supports (14). Each cross bar support (14) is, in turn, welded at either end to an end support bar (8) which is parallel to the tie rods (12) and perpendicular to the cross bar supports (14). The assembly is encapsulated in a heavy plastic coating (20). The encapsulation of the deck bar pairs (18) has a generally cam shaped cross section (19), which shape facilitates the run off of animal wastes.

3 Claims, 4 Drawing Sheets

UNI-CONSTRUCTION LIVESTOCK FLOORING

FIELD OF THE INVENTION

This invention relates to the provision of comfortable, safe and hygienic raised flooring for use during the confinement of livestock; specifically pigs.

DESCRIPTION OF THE PRIOR ART

Pig rearing is an important supplimentary enterprise on dairy, livestock and grain farms with an ever increasing number of farms now devoted primarily to pig production. Many of these enterprises include complete confinement units that farrow 500 to 1000 sows or confinement units in which several hundred pigs are fed from weaning to market weight.

The use of raised, slotted floors in the confinement buildings is commonplace in such enterprises both as a labour saving device for the farmer and as a means of improving general living conditions for the animals.

Particularly in northern latitudes where the temperature frequently dips below zero, such raised flooring provides a degree of insulation between the animal and the underlying concrete floor of the building. Sanitation is also improved considerably by virtue of the fact that animal wastes flow through the slats and can be contained in a subsurface pit specifically designed as a waste collection system.

Initially such raised flooring was comprised of a wooden subframe laid around the perimeter of the pen with wooden slats equally spaced and affixed to the upper surface. Such flooring, however suffered from a number of disadvantages, not the least of which was the relatively large amount of labour involved in removal for cleaning and maintenance purposes. In addition, the wood tended to deteriorate through constant exposure to urine and fecal matter.

In an effort to resolve this latter problem slats were constructed from a variety of materials other than wood—concrete and plastic being the most common. While certainly an improvement over wood, such alternate materials did little to address the problem of easy removal for maintenance purposes.

Thereafter inventors developed various forms of raised flooring based on a system of modular flooring elements wherein such elements could be combined to form a complete floor, yet be removed in easy to handle sections, thus obviating the problems associated with maintenance.

Of course, with the introduction of modular flooring systems the need to make such modules as light as possible resulted in the elimination of the relatively heavy slats in favour of a lighter surface structure.

One such alternate surface structure was comprised of expanded metal panels covered by a layer of resilient material—typically plastic. Such surface panels, however, contained numerous sharp edged corners and with constant use tended to break through the plastic coating, exposing the metal directly to the decomposing effects of the animal wastes.

Variations on the coated metal surface were implemented, eventually leading to the structure first disclosed in U.S. Pat. No. 4,362,128 to Downey (1982) and upon which the present invention is an improvement.

The device disclosed by Downey in the above mentioned United States patent is a raised, modular flooring system requiring no independent framing and is comprised of an upper surface, or deck, formed by filler wires and base wires arranged perpendicular to said filler wires. The base wires are welded or crimped together to form a single coherent surface structure which is, in turn, supported by a plurality of support bars extending parallel to each other and perpendicular to said base wires. The support bars are welded to the underside of the deck thus formed. Welded to the base of each support bar are a plurality of tie rods extending perpendicular thereto. The completed flooring module is coated with a plastic coating by means of either spraying, dipping, fluid bed deposition or electro-deposition.

While the Downey flooring system overcomes many of the problems discussed above in respect to alternate forms of raised flooring, it nevertheless suffers from several disadvantages. One such disadvantage derives from the fact that the deck base bars are of a circular cross section which, apart from yielding an un-natural and relatively uncomfortable surface, are of insufficient strength to support the weight of multiple animals without considerable flexing. Such continuous flexing leads to fatique cracking and eventual break-up of the outer plastic coating. In addition, liquid and solid animal wastes tend to adhere to the underside of the base bars—again as a result of their cross sectional shape—thus increasing the effort required for cleaning and maintenance.

Another disadvantage of the Downey flooring systems goes to the physical configuration of the components and their relationship to each other during the assembly process, i.e., the design of the system creates a gap between the support bars and the base bars, neccesitating the use of filler rods, thus increasing manufacturing time and consequently, end user costs.

OBJECTS AND ADVANTAGES

Accordingly, besides the objects and advantages of the raised livestock flooring described above, several objects and advantages of the present invention are:

(a) to provide a modular, raised livestock flooring requiring no independent subframe;

(b) to provide a modular, raised livestock flooring wherein the deck surface is more nearly flat, thus more natural and comfortable to the animals;

(c) to provide a modular, raised livestock flooring wherein solid and liquid wastes do not adhere to the underside of the deck components, thus facilitating ease of cleaning;

(d) to provide a modular, raised livestock flooring wherein the deck rods are arranged in such a manner as to permit the application of heavier coating material; and (e) to provide a modular, raised livestock flooring wherein the deck components are subjected to very little continuous flexing.

Further objects and advantages are to provide a modular, raised livestock flooring which can be manufactured inexpensively and accurately while utilizing a minimum of components.

Still further objects and advantages will become apparent from a consideration of the ensuing description and drawings.

DRAWING FIGURES

In the annexed drawings

FIG. 1 is a perspective view of the underlying flooring structural components.

Figure 2:
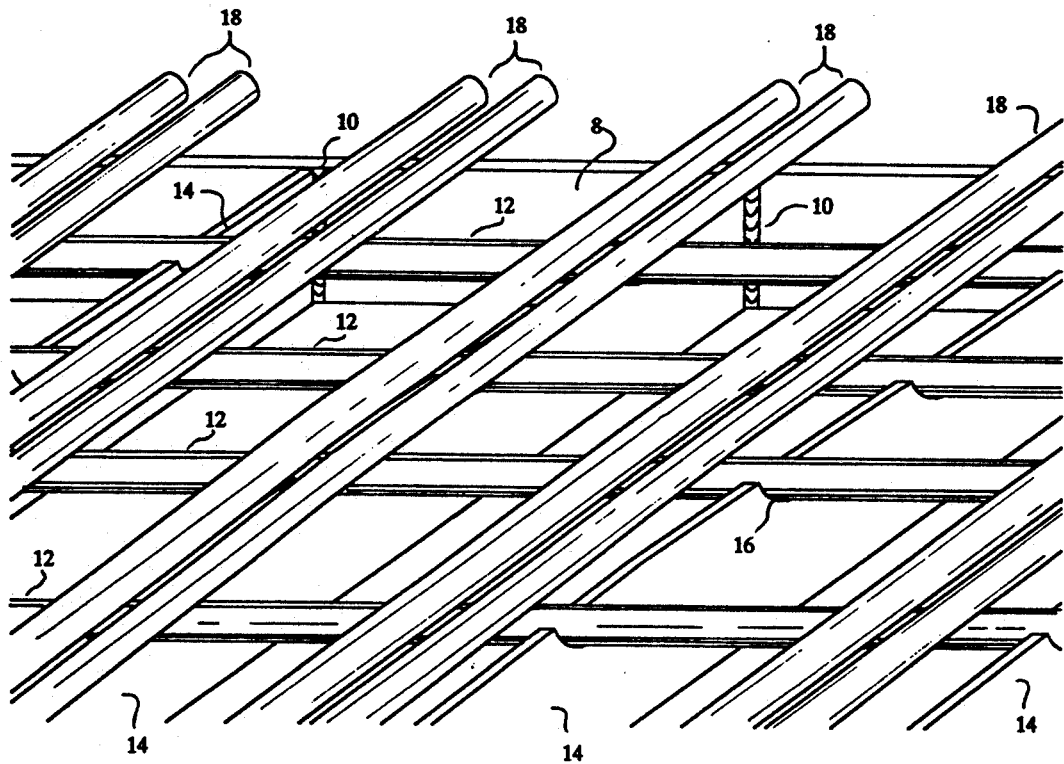

FIG. 2. is a perspective view of the underlying flooring structural components with the positioning of the deck components shown.

Figure 3:
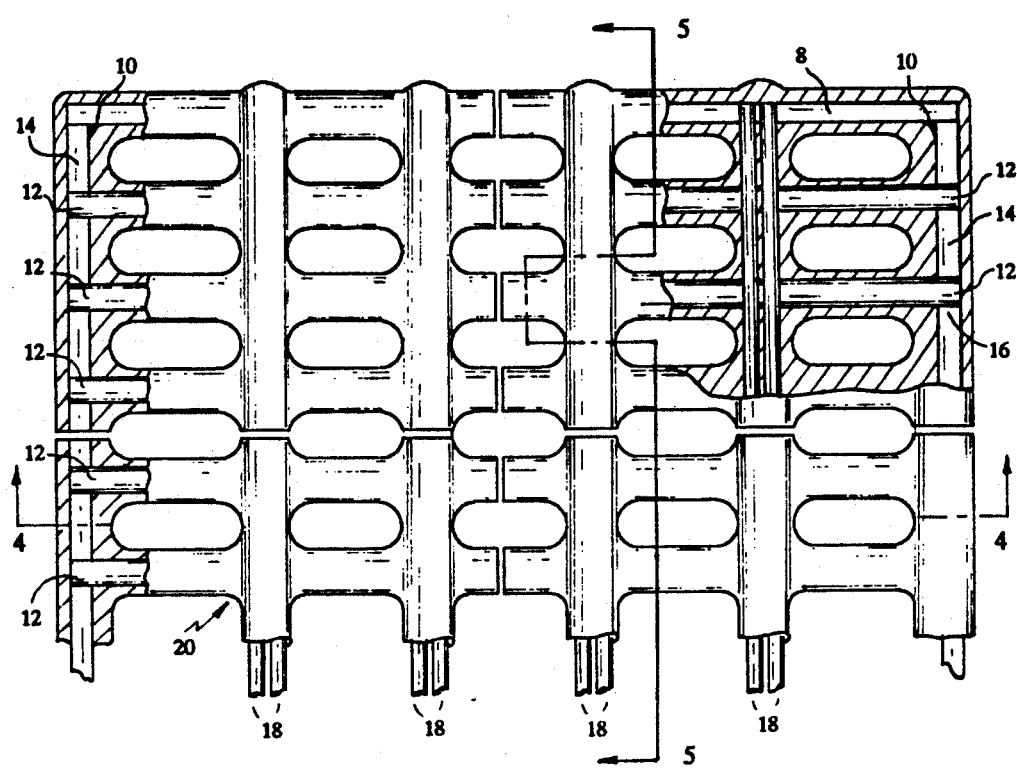

FIG. 3. is a plan view of a portion of the flooring with various cut-a-ways showing the relationship of the components.

Figure 4:
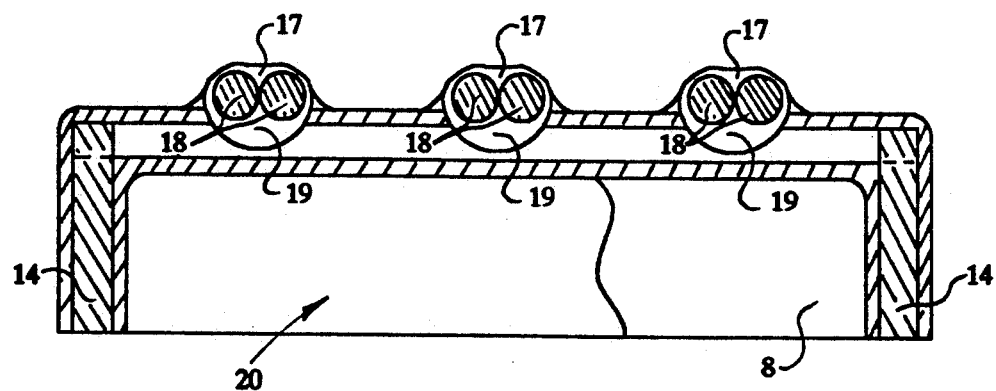

FIG. 4. is a sectional view taken along the plane 4—4 in FIG. 3.

Figure 5:
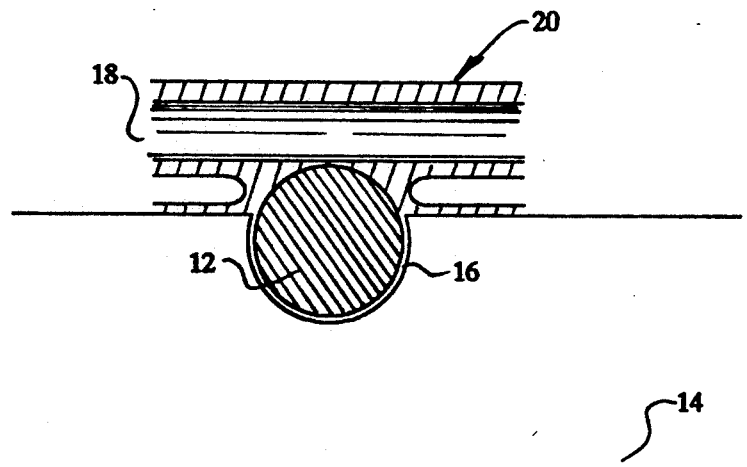

FIG. 5. is a sectional view taken along the plane 5—5 in FIG. 3.

The numerals used in the drawings to designate various components are:
08 end support bars
10 welds
12 tie rods
14 cross support bars
16 fuse welds
18 deck bars
20 outer coating

DESCRIPTION—FIGS 1 TO 5

The modular, raised flooring of the present invention is comprised of a plurality of equally dimensioned cross support bars 14 consisting of flat, rigid and robust material and of uniform thickness, positioned on edge, parallel to each other and substantially equally spaced one to the other.

Each end of each of the cross support bars 14 is permanently affixed, by means of weld 10, and at an angle of ninety degrees to an end support bar 8 consisting of flat rigid, robust material having a height and thickness substantially equal to that of each of the cross bars 10.

A plurality of tie rods 12 consisting of rigid, robust material, each of substantially equal dimensions and circular cross section are permanently impressed, by means of press-fused welds 16, into the upper edge of each of the cross supports 14, perpendicular to each of the cross supports 14, a substantially equal distance apart, and parallel to each of the end supports 8, to a depth closely approximating the diameter of each of the tie rods 12. The structure thus formed is generally rectangular in shape and reticulated.

A plurality of deck bars 18 consisting of rigid, robust material, each of substantially equal dimensions and circular cross section are permanently affixed in pairs, by any conventional means such as welding or crimping, to the upper surface of each of the tie rods 12, perpendicular to each of the tie rods 12, each pair a substantially equal distance apart and parallel to the cross supports 14.

The flooring module thus created is chemically cleaned and coated by conventional means, well understood by those skilled in the art, with a plastic outer coating 20 such that the cross supports 14, the end supports 8, the tie rods 12 and the deck bars 18 are completely encapsulated by the coating 20.

The coating 20 surrounding the deck bars 18 forms, by gravity, a generally cam shaped cross section 19 while providing a relatively flat upper surface and additional cushioning where extra coating 20 material is accumulated in the "valley" 17 created by the side-to-side placement of the deck bar 18 pairs.

During manufacture the dimensions representative of average grid openings employed in the preferred embodiment of the present invention will vary according to animal weight with adjustment required to accommodate new-born pigs, 25 to 40 lbs to market and sows and boars. Likewise, the diameter of the tie rods 12 and deck bars 18 may be varied according to animal weight or, in the alternative, set at a dimension sufficient to offer adequate support to the heaviest anticipated animal loading.

From the above description, a number of advantages of the present modular raised livestock flooring system become evident:

(a) the coated, paired, deck bars provide a more naturally flat and comfortable surface for the animals than that of the prior art;

(b) the generally cam shaped coating ensures a more complete run-off of animal wastes than the circular shape of the deck bars of the prior art;

(c) the use of paired deck bars combined with the additional thickness of the outer coating provides for a sturdier surface structure than that of the prior art, thus reducing flexing and fatique cracking of the outer coating and hence, increasing the useful lifetime of the flooring module;

(d) the press fused welding of the tie rods into the body of the cross support bars eliminates the need for the filler rods of the prior art; and (e) the structure as described in the present disclosure uses fewer components than the prior art and is more readily adaptable to precision assembly methods using special jigs.

SUMMARY, RAMIFICATIONS AND SCOPE

Accordingly, the reader will see that the modular, raised livestock flooring of the present invention described herein offers a more robust, comfortable and sanitary flooring system than that of the prior art.

In addition, the invention as herein presented utilizes well known and well understood manufacturing technologies and uses a minimum of components, thus reducing manufacturing costs.

Although the description above contains many specifications, these should not be construed as limiting the scope of the invention but as merely providing an illustration of the presently preferred embodiment of the present invention. For example, it is entirely reasonable to contemplate the herein described flooring module as a one piece plastic injection moulded construct.

Thus the scope of the invention should be determined by the appended claims and their legal equivalents, rather than by the examples given.

I claim:

1. A modular, raised livestock flooring structure comprised of:

a plurality of rigid cross supports disposed parallel to each other and equi-distant apart and welded at each end to perpendicularly oriented rigid end supports;

a plurality of rigid circular tie rods oriented at right angles to said cross supports and press fused welded at equal distances apart to a depth approximating the diameter of said tie rods into the upper surface of said cross supports;

a plurality of rigid circular bars arranged in intimate pairs with each pair substantially equi-distant from the next pair and all pairs permanently affixed at right angles to the upper surface of said circular tie rods; and a completely encapsulating means.

2. The encapsulating means of claim 1 wherein said means enclosing said circular bar pairs has a generally cam shaped cross section.

3. The encapsulating means of claim 1 wherein said means is formed of resilient material.

* * * * *